Patented Aug. 2, 1938

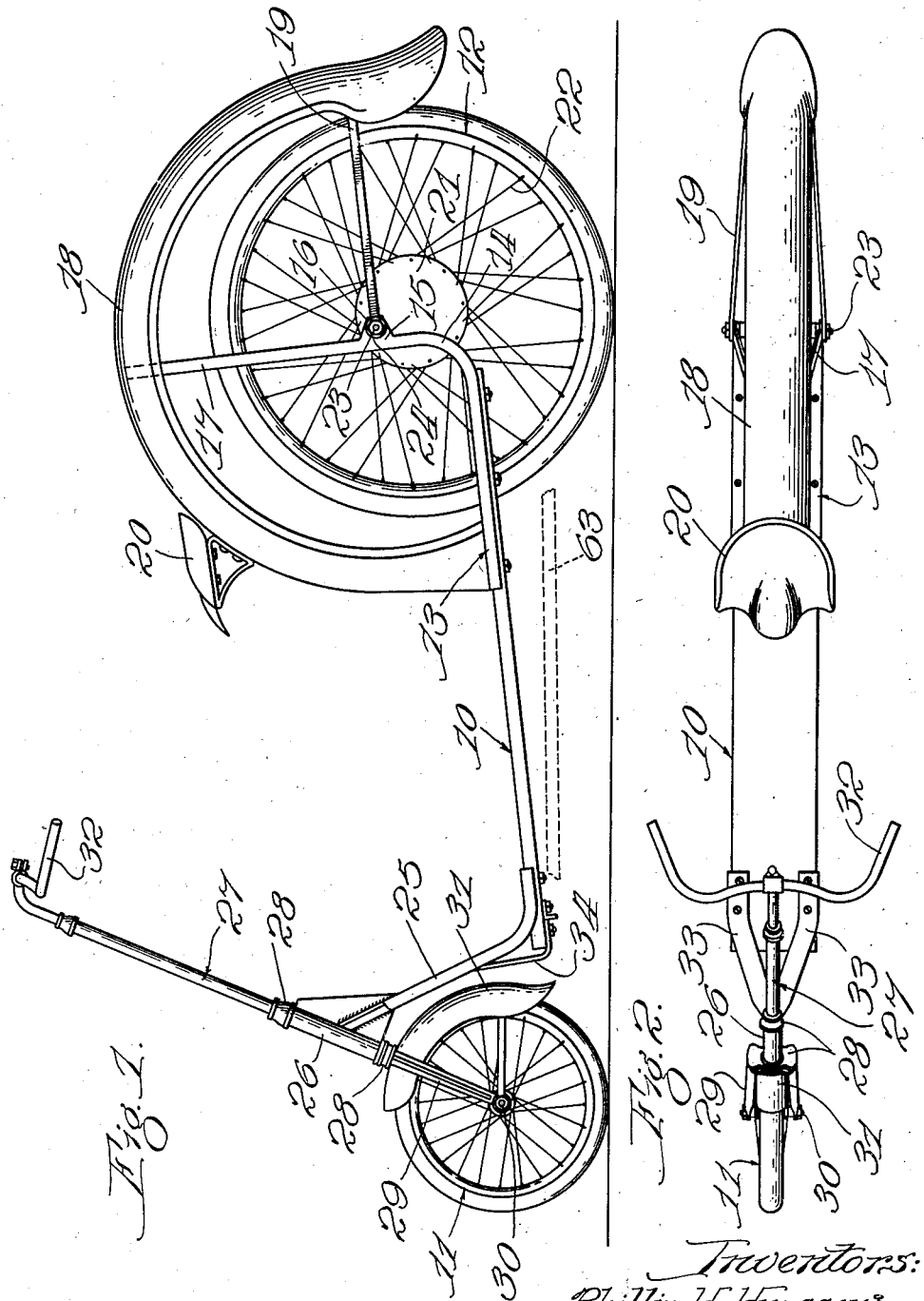

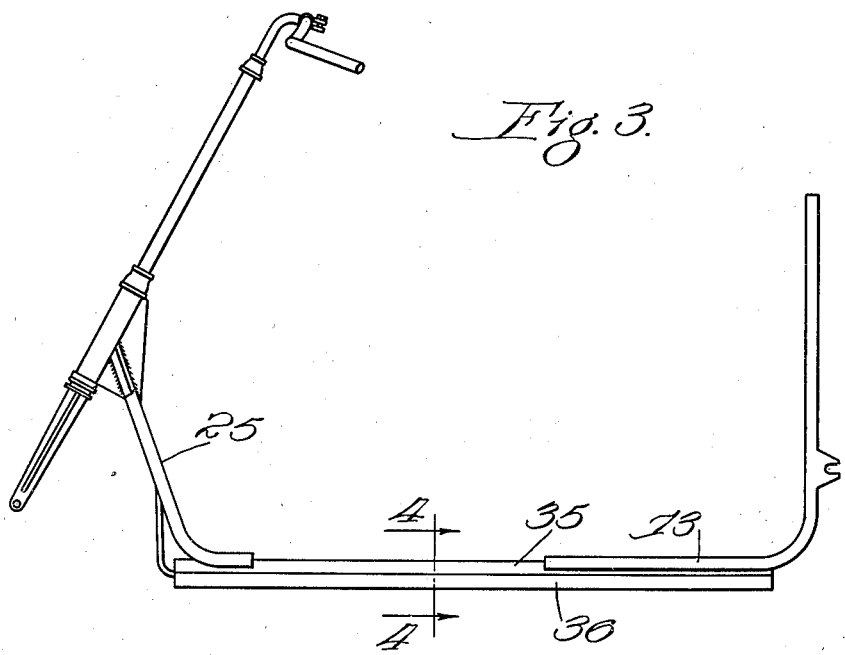
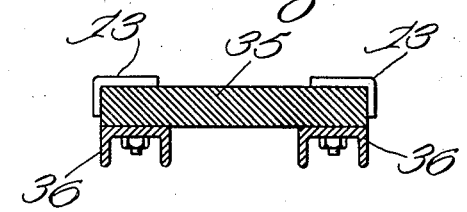
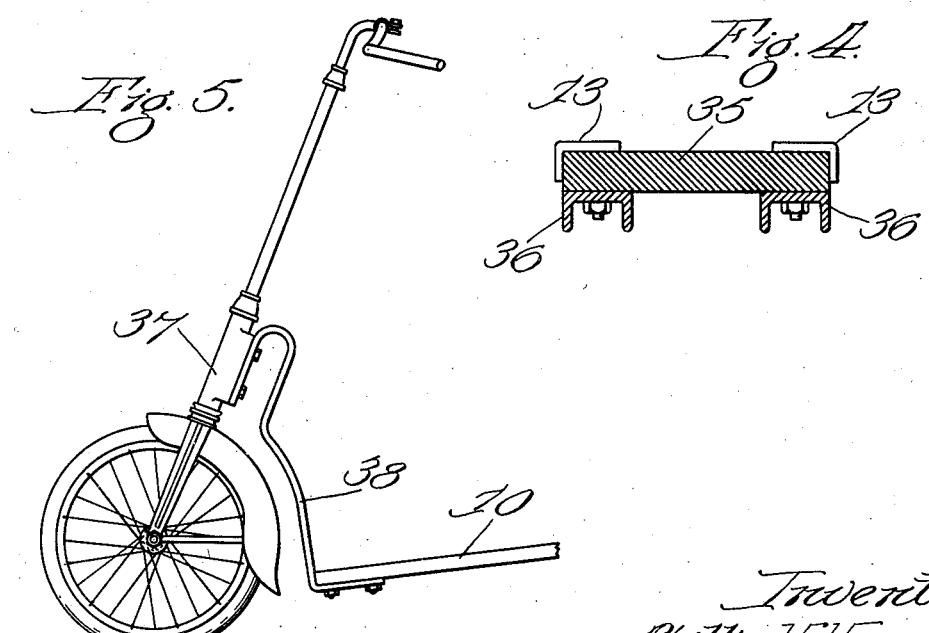

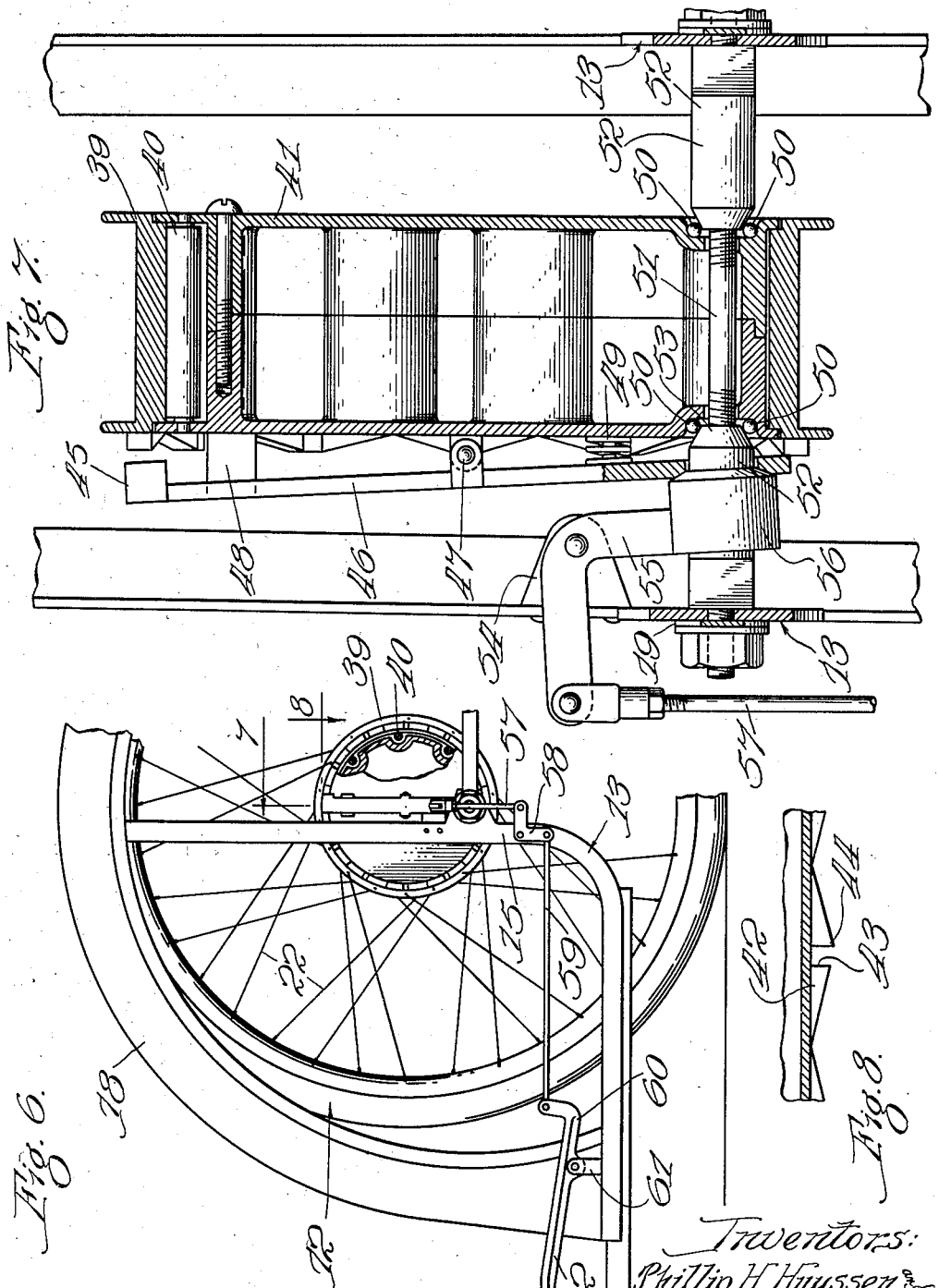

2,125,568

UNITED STATES PATENT OFFICE 2,125,568

SELF-PROPELLING VEHICLE

Phillip H. Huyssen and Prescott S. Huyssen, Chicago, Ill.

Application March 24, 1934, Serial No. 717,230

6 Claims. (Cl. 280—229)

This invention relates to a self-propelling vehicle and more particularly to a vehicle which is propelled by the rider standing on the footboard of the vehicle and shifting his weight thereon. An object of the invention is to provide a vehicle device which may be propelled by the rider with ease and at a relatively high speed.

Heretofore, it has been attempted to produce a self-propelling vehicle of a toy type in which a platform or footboard is supported between two longitudinally spaced wheels, the footboard being connected to the rear wheel by an eccentric axle connection. The devices were of the usual scooter type and were provided with scooter wheels of from seven to nine inches in diameter. Such devices have been found impracticable and, so far as we can determine, have been abandoned as failures.

We have discovered that by making important changes in the above type of vehicle, that not only can the device be made practical, but it can be converted into an efficient and easily operated carrier mechanism having a speed rivalling that of a bicycle. The reasons for the failure of the scooter type of device and for the success of our device will become apparent as we proceed with the detailed description of the invention.

The invention is illustrated, in its preferred embodiments, by the accompanying drawings, in which—

Figure 1 is a side view in elevation of a device embodying our invention; Fig. 2, a plan view; Fig. 3, a side view in elevation of the frame of a modified form of our invention; Fig. 4, a transverse sectional view, the section being taken as indicated at line 4 of Fig. 3; Fig. 5, a broken detail view of a modified form of our invention; Fig. 6, a broken and enlarged detail view of the rear wheel of the vehicle equipped with a coaster mechanism; Fig. 7, an enlarged sectional view, the section being taken as indicated at line 7 of Fig. 6; and Fig. 8, a detail sectional view, the section being taken as indicated at line 8 of Fig. 6.

In the illustration given in Figs. 1 and 2, a platform or running board 10 is suspended between a front wheel 11 and a rear wheel 12. The board 10 may be formed of any suitable material. In the illustration given, a hickory board is employed having its rear end portion slotted to provide a working space for the wheel 12. Secured at each side of the slot and running substantially the length thereof are metal supports 13 which are curved upwardly at 14 to provide a substantially vertical shank 15 for supporting the eccentric axle 16 of wheel 12. Preferably, the supports 13 are connected by a U-shaped yoke member 17 which is integrally formed with the supports 13. The U-shaped member 17 provides a support for the fender 18 which extends above wheel 12, and which is secured to the footboard 10 at a point just forward of the wheel-slot. The rear portion of the fender 18 is supported by a pair of braces 19 which are secured to the axle of wheel 12. If desired, a seat 20 may be supported by the forward vertical portion of fender 18.

The wheel 12 may be formed in any suitable manner, provided it affords sufficient circumferential travel for each rotation of the eccentric axle connection, as will be dealt with later in detail. In the illustration given, a bicycle wheel of twenty-eight (28) inches in diameter is provided with a central metal hub 21 to which are secured the wire spokes 22. The hub is preferably provided at an eccentric point with roller bearings (not shown) for supporting the axle 23. If desired, instead of employing the central metal hub 21 to which the roller bearings are secured at an eccentric point, a simple roller bearing hub of ordinary construction, as used in bicycles, may be secured at an eccentric point within the wheel with wire spokes of varying lengths connecting the hub to the rim; or the hub may be supported at an eccentric point within a disk wheel. The support member 13 is provided with an enlarged integral portion 24 which is fixed to the axle shaft 23.

Secured to the forward end of board 10 is a metal connecting piece 25 providing at its upper end a tubular guide 26. A steering shaft 27 extends through the tubular support 26 and is provided with cylindrical bosses 28 engaging each end of the tubular member 26. The lower end of the shaft 27 is provided with the usual bifurcated bar 29 straddling wheel 11 and secured to the axle 30 thereof. If desired, a fender may be supported over wheel 31. The upper end of the steering shaft 27 may be provided with handle bars 32.

The metal connection 25 at the forward end of board 10 is provided with depending furcated straps 33 which are bolted to the top of board 10. A third central strap 34 extends below the board 10 and is bolted to the bottom thereof.

In the modification shown in Figs. 3 and 4, the construction of the frame is substantially the same as that shown in Figs. 1 and 2, except that the running board comprises an upper wooden board 35 braced on its lower side by longitudinally extending U-beams 36. Secured to the top member 35 are the same metal supports 13, and secured to the forward end of the platform is the same metal connection 25, as shown in Figs. 1 and 2. The construction shown in Figs. 3 and 4 provides an unyielding frame mechanism by which all tendency of the bed or other portion of the frame to swing under the weight of the rider, is eliminated, thus overcoming any loss of energy through this means.

In the modification shown in Fig. 5, the board 10 is connected at its forward end with a tubular support 37 by spring element 38. With this construction, the frame yields through the element 38 and not at other points, the advantage being that the yielding is accomplished at a forward end of the frame, with the result that the arc of movement of the board 10 in the operation of the machine is reduced.

In Figs. 6, 7 and 8, the rear wheel 12 is shown provided with coaster mechanism. In this construction, the spokes 22 are connected directly to a ring or collar 39 which is mounted on roller bearings 40 carried by the hub member 41. Secured to one side of the ring 39, near its outer periphery, is a series of inclined cams 42 providing, between their higher points, locking slots 43. Preferably, the cams are formed as shown in Fig. 8, with the cam on one side slightly rising above the cam on the other side, to provide a stop shoulder 44. A locking lug or tooth 45 is carried upon bar 46 and is adapted to enter a locking slot 43. The bar 46 is pivotally secured to the hub 41 at 47, and spaced guides 48 are provided near the outer end of bar 46 to prevent lateral swinging of the bar under strain. On the inner side of bar 46 is a compression spring 49 which urges the inner end of the bar outwardly, and normally holds the locking lug 45 within one of the locking recesses 43 of ring 39.

Means for depressing the inner end of bar 46, and thereby releasing the connection between hub 41 and ring 39, will now be described. As shown more clearly in Fig. 7, the hub 41 is provided with ball bearings 50 in which is mounted an axle shaft 51, provided at its ends with cones 52, having their beveled shoulders 53 bearing against the ball bearings 50. The axle ends are secured to the supports 13. Secured to a flange of the support 13 is a boss 54 to which is pivoted a bell-crank lever 55. The free end of the bell-crank lever is provided with a cylindrical collar 56, extending about the adjacent cone 52, and adapted to engage the inner end of bar 46. The other end of the bell-crank lever 55 is connected by a strap 57 with another bell crank 58, which is pivotally secured to the vertical shank 15 of the support 13. The lower end of the bell-crank is connected by a link 59 to the presser-arm 60 which is pivotally connected at an intermediate point to bracket 61, and which is provided with a foot pedal 62.

Operation

The rider, after first pushing the vehicle fast enough to enable it to remain erect, stands on the board, and then by shifting his weight so as to throw the full force of his weight upon the rear portion of the board as the axle reaches the position shown in Fig. 1, and as little as possible of his weight upon the board when the axle reaches its lower position and moves upwardly toward the initial position, propels the vehicle forward at an increasing speed. The constant shifting of weight in rhythm with the rising and falling of the axle of wheel 12, provides energy which is utilized by the eccentric connection with the rear wheel. While some slight yielding in the frame in board 10 may take place in the construction shown in Figs. 1 and 2, this is avoided entirely in the modification shown in Figs. 3 and 4. In the modification of Fig. 5, the yielding takes place at the spring connection element 38 rather than in other parts of the frame. With the construction shown in Figs. 3 and 4, the entire frame swings about the axle of the front wheel.

In the operation of the coaster device shown in Figs. 6-8, the spring 49 normally urges the inner end of bar 46 outwardly so as to bring the locking lug 45 at the outer end of bar 46 into engagement with the recess 43. It will be noted, as shown in Fig. 8, that the shoulder 44 serves to stop the lug 45 as it slides along the cam 42, and thus causes it to drop into recess 43. In order to release the ring 39 from engagement with hub 41, the rider presses the foot pedal 62 downwardly so as to force the collar 56, through the medium of the connecting straps and bell-cranks, against the inner end of bar 46, as shown more clearly in Fig. 7. The locking lug 45 is thus held out of contact with the locking recesses 43. The weight of the board and frame then holds the hub 41 in the lower position shown in Fig. 6, while the ring 39 rotates on the rollers 40 of the hub as a center for the wheel. Thus, the rising and falling of the wheel is avoided, and the rider may coast down a hill just as on a bicycle. When the rider releases the pedal 62, the reverse action takes place, spring 49 again urging the inner end of bar 46 outwardly and the locking lug 45 slipping over cam 42 and into the next locking recess 43.

A most important feature of our new vehicle is the size of the drive-wheel or rear wheel or, more specifically, the ratio of the circumferential travel of the wheel to each rotation of the eccentric axle. We have discovered that if a wheel of the scooter type of vehicle is employed having the usual diameter of, say, six to nine inches, or even slightly larger, the impulses caused by the rising and falling of the axle occur so frequently, that it is physically impossible for the rider to develop power. In other words, the scooter type of vehicle does not take into account the human equation, and the rhythm required for the operation of such a toy vehicle is entirely beyond that to which the human body can adapt itself. In order to maintain the device in an upright position, it is necessary for the rider to move it at a speed considerably faster than walking speed. When this is done, the drive-wheel having a circumference of from one and one-half (1½) to two and one-half (2½) feet, requires the necessary shifting of the weight forward and backward, two operations within an extremely brief moment, so that it is practically impossible to operate the device at all; and even if the device could be kept going for a short time, any substantial change of speed is out of the question. When, however, the size of the wheel is just about trebled, a surprisingly easy and effective operation is obtained, with the development of considerable power and speed. With the drive-wheel traveling some seven or eight feet to each rising and falling of the eccentric axle, there is a sufficient time interval afforded for the rider to shift his weight in rhythm with the axle and with steadily accelerating speed.

We have found that the vehicle operates successfully with wheels having diameters of twenty-six (26), twenty-eight (28) and thirty-two (32) inches. Drive wheels of diameters ranging up to forty (40) inches and more, provide a satisfactory vehicle. It is possible to utilize the invention with wheels of lesser diameters ranging down to twenty (20) inches, but with much less satisfactory results because the operating impulses with the twenty (20) inch wheel are so frequent as to make operation difficult. Wheels of diameters below fifteen (15) inches are, from all our experience, impractical as drive-wheels in a vehicle of this type.

The important thing is the distance traveled by the wheel for every rotation of the eccentric axle. Gear connections can be provided by which the wheel can be driven more rapidly than the axle so that for a single rising and falling of the axle, several revolutions of the wheel might be effected. The effect of such a construction is substantially to increase the distance traveled by the wheel for a single rotation of the axle. In the illustration given in this application, a large wheel is shown, and the large wheel is preferred because of economy and simplicity.

Another important phase of the invention is the suspension of the platform or footboard 10 at an elevation very close to the ground. The underslung construction shown in the drawings is important because the rider must be able to step upon the board and off the board easily in stopping and starting the vehicle. A high footboard, say supported on a line between the axle of the front wheel and of the large rear wheel, would be impracticable because of the danger of falling and the difficulty of operation.

In the construction shown more clearly in Fig. 1, the dotted lines 63 indicate the lower position of the board 10 and illustrate the arc through which the footboard moves in the operation of the device. It will be noted that the dotted lines of the lower position are substantially horizontal.

The seat 20 not only may be used when the vehicle is coasting but also, from its location, may be used by the rider in propelling the device; that is, the rider may throw his weight upon the seat when the eccentric connection is up and then throw his weight forwardly when the eccentric connection is down, thus simulating posting in horse-back riding.

While we have described the device in detail, it will be understood that considerable changes can be made in the design and construction of the device without departing from the spirit of our invention. The foregoing detailed description has been given for clearness of understanding only, and no unnecessary limitation should be understood therefrom, but the appended claims should be construed as broadly as permissible, in view of the prior art.

We claim:

1. In a vehicle, a pair of spaced wheels, at least one of which is a drive-wheel, a footboard, means for suspending the board between the wheels, said means providing an eccentric connection with the drive-wheel, and releasable coaster means associated with the drive-wheel for providing an eccentric axis rotation for the drive-wheel.

2. In a vehicle, a pair of spaced wheels, a footboard, means for suspending the board between the wheels, said means providing an eccentric connection with the rear wheel, and releasable coaster means including a release lever carried by the footboard for providing a central axis upon which the rear wheel rotates freely.

3. In a vehicle, a pair of spaced wheels, a footboard, means for suspending the board between the wheels, said means providing an eccentric connection with the hub of the rear wheel, said rear wheel being provided with a hub, a ring member rotatably mounted on the hub, means connecting said ring member to the rim of the wheel, and releasable locking means for connecting said hub and said ring.

4. In a vehicle, at least a pair of spaced wheels, a steering shaft supported on one of said wheels, a rigid hanger suspended from said steering shaft, a rigid hanger eccentrically connected to the other of said pair of wheels, and a resilient foot support extending between the lower portions of said hangers and secured thereto.

5. In a vehicle, a pair of spaced wheels, a steering shaft supported on one of said wheels, a hanger member depending from said steering shaft, a rigid and inverted U-shaped hanger member extending over the other of said pair of wheels and eccentrically connected thereto, said second-mentioned hanger member extending downwardly below said eccentric connection, and a resilient foot board secured to the lower ends of said hanger members.

6. In a vehicle of the character set forth, a front wheel and a rear wheel, a steering shaft supported upon said front wheel, a hanger member depending from said steering shaft, a brace member extending about said rear wheel and eccentrically connected thereto, said brace member being provided with depending rigid hanger members, and a spring foot support extending between said hanger members and secured to the lower portions thereof.

PHILLIP H. HUYSSEN.
PRESCOTT S. HUYSSEN.